United States Patent [19]

Kawata et al.

[11] 4,328,518

[45] May 4, 1982

[54] VIDEO SIGNAL, SPEED-CHANGE REPRODUCING SYSTEM

[75] Inventors: Singo Kawata, Yokosuka; Takashi Takano, Yokohama, both of Japan

[73] Assignee: Victor Company of Japan, Ltd., Yokohama, Japan

[21] Appl. No.: 141,315

[22] Filed: Apr. 18, 1980

[30] Foreign Application Priority Data

Apr. 18, 1979 [JP] Japan .................. 54-47443

[51] Int. Cl.³ ............................................. H04N 5/79
[52] U.S. Cl. .................................... 360/10; 360/64
[58] Field of Search .................. 360/10, 9, 33, 11, 61, 360/64; 358/4, 8

[56] References Cited

U.S. PATENT DOCUMENTS

| | | | |
|---|---|---|---|
| 3,157,739 | 11/1964 | Okamura | 360/33 |
| 3,911,483 | 10/1975 | Kihara et al. | 360/33 |
| 3,925,816 | 12/1975 | Kihara | 360/33 X |
| 3,968,518 | 7/1976 | Kihara et al. | 360/10 X |
| 4,197,562 | 4/1980 | Kikuya et al. | 360/10 |

FOREIGN PATENT DOCUMENTS 54-105508 8/1979 Japan ........................ 360/10

*Primary Examiner*—James W. Moffitt
*Assistant Examiner*—Donald McElheny, Jr.
*Attorney, Agent, or Firm*—Louis Bernat

[57] ABSTRACT

A video signal speed-change reproducing system reproduces video signals which are recorded by alternately a pair of rotary recording heads mounted on diametrically opposite sides of a rotating member. The video signals are recorded on video tracks disposed contiguously and obliquely relative to the tape longitudinal direction. The recording heads have gaps of mutually different azimuth angles. In the reproducing system, the video signal recorded on the tape is reproduced by means of a pair of reproducing heads for exclusively reproducing which are mounted on diametrically opposed sides of a rotational member. The tape is caused to travel at a speed different from a tape speed for normal reproduction (and recording), or to stop. The reproducing heads have gaps of the same azimuth angle as the azimuth angle of either one of the recording heads.

5 Claims, 7 Drawing Figures

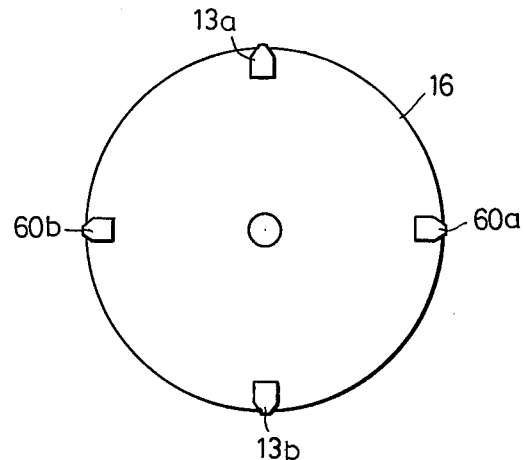
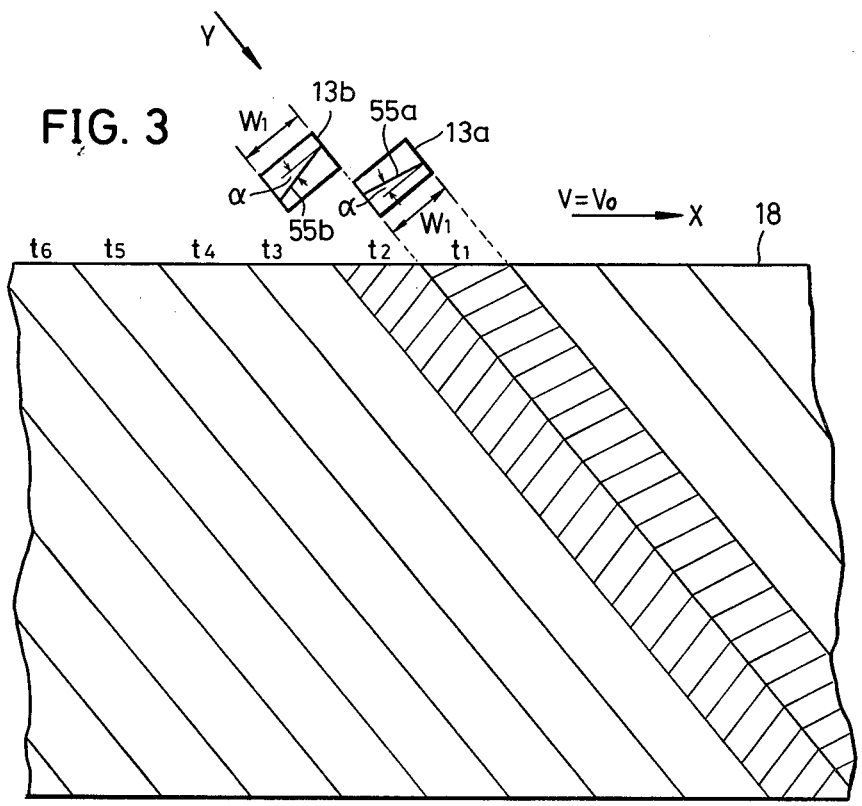

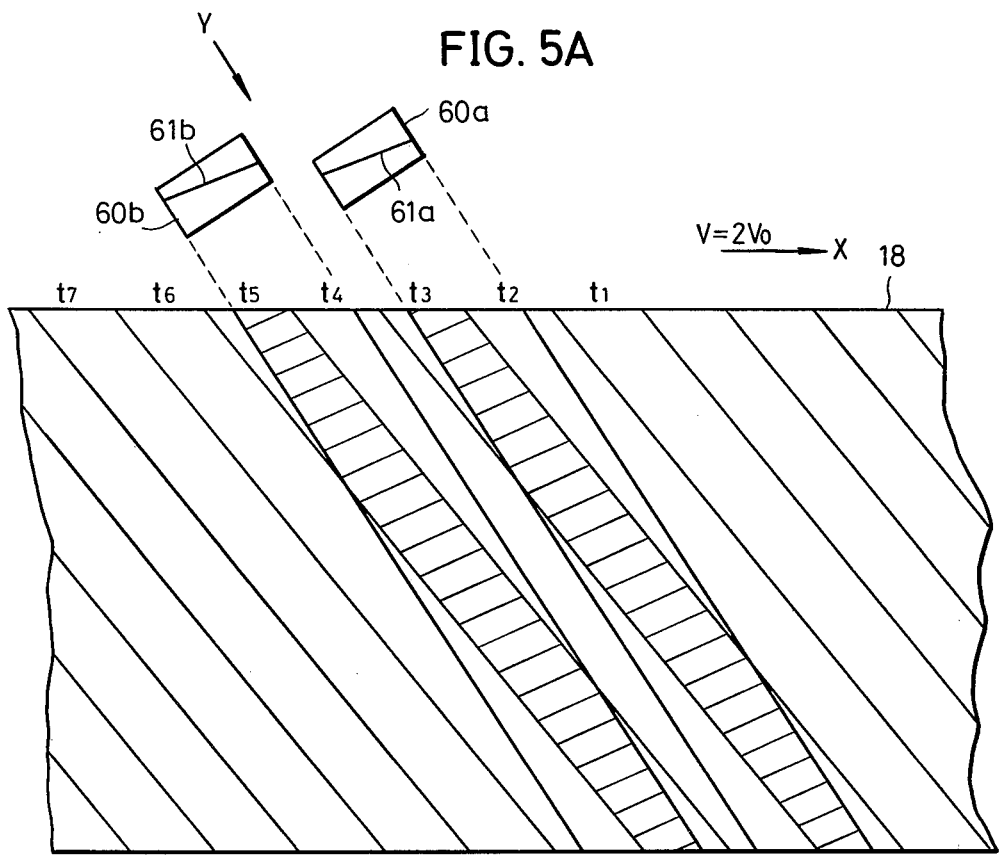
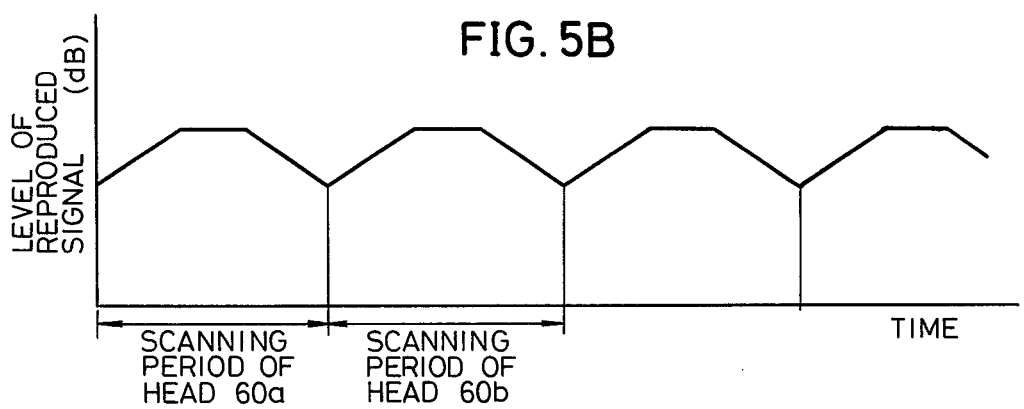

VIDEO SIGNAL, SPEED-CHANGE REPRODUCING SYSTEM

BACKGROUND OF THE INVENTION

The present invention relates generally to video signal, speed-change reproducing systems, and more particularly to a video signal, speed-change reproducing systems for reproducing a video signal recorded on mutually adjacent tracks with a first pair of alternately active heads having mutually different azimuth angles. The tape travels at a speed which is different from the speed used for making the recording. The recorded signal is reproduced by a second pair of reproducing heads each of which has the same azimuth angle, which may be the same as the azimuth angle of either one of the first pair of heads.

The prior art employs a system wherein a video signal is recorded on a magnetic tape on parallel tracks formed obliquely to the longitudinal direction of the magnetic tape. This tape either stops or travels at a tape speed which is differrent from that used at the time of recording, thereby to carry out speed-change reproduction such as quick-motion reproduction, slow-motion reproduction, or still picture reproduction. In this system, the tape speed at the time of reproduction is different from that at the time of recording. Therefore the path (track) on the tape on which the head traces during reproduction is different from the path (track) traced by the head during recording.

On the one hand, a conventional video signal record- 4,178,606, issued Dec. 11, 1979. In this previously developed system, a pair of azimuth heads have gaps which are inclined with a certain azimuth angle, in mutually opposite directions with respect to a direction perpendicular to the longitudinal direction which is of the track. Neighboring tracks are formed in contiguous contact side-by-side without a gap or guard band therebetween. The phase of the chrominance signal is shifted by 90 degrees for every horizontal scanning period. The direction of this phase shifting is reversed from one track to the next neighboring track. In accordance with this system, the tape utilization efficiency is high since the tracks are in close contact with each other. Moreover, there is no beat disturbance.

In this developed system, if the tape speed is merely varied at will in order to carry out speed-change reproduction, a noise component due to a decreasing of the reproduced signal level accompanying tracking deviation will appear at irregular positions on the reproduced picture screen. For this reason, the noise part in the picture moves, and the S/N ratio of the entire picture becomes poor. Consequently, a speed-change reproduced picture cannot be obtained in good picture quality.

In order to remove the above described disadvantages, a new system has been described in U.S. patent application Ser. No. 58,537 entitled "Video Signal, Speed-Change Reproducing System" which is a continuaton-in-part of U.S. patent application Ser. No. 891,409, now abandoned. According to this system, and Furthermore, a more substantial problem is that, particularly at the time of reproduction of a still picture, a pair of heads of mutually different azimuth angles respectively scan helically across two or three tracks and respectively reproduce signals of tracks recorded by heads of the same azimuth angle as the heads carrying out reproduction scanning. Accordingly, even when the tape is not traveling, a reproduced signal of one track and a reproduced signal of a track adjacent thereto are alternately obtained from the pair of heads. Ordinarily, a video signal for one field is recorded along each track. For this reason, the video signals of two fields are reproduced alternately for one field at a time.

However, in the case where the information content of the recorded video signal is that of an image of rapid movement, the information signal of the video signal differs slightly for every field. For this reason, when a reproduced signal obtained as described above by reproducing the video signals of two fields alternately for one field at a time is reproduced as a still picture, the parts of rapid movement do not become completely still and give rise to a problem in that the picture image becomes one wherein there are minute oscillations such as flickers.

SUMMARY OF THE INVENTION

Accordingly, it is a general object of the present invention to provide a novel and useful system for speed-change reproduction of a video signal in which the above described difficulties have been overcome.

Another object of the invention is to provide a video signal, speed-change reproducing system for reproducing a video signal recorded on mutually adjacent tracks with a first pair of alternately active heads having mutually different azimuth angles, in which the recorded signal is reproduced by a second pair of reproducing heads each of which has the same azimuth angle, which may be that of either one of the first pair of heads, while the tape is traveling at a speed which is different from the speed used for the recording. By the use of the system of the present invention, the signal of one and the same track is reproduced by a pair of reproducing heads at the time of still picture reproduction. For this reason, even when the video information content is one of rapid movement, a completely still picture is obtained.

A further object of the invention is to provide a system for reproducing video signals at changed speeds in which the track width of the above mentioned second pair of heads of the same azimuth angle is made greater than the track width of first pair of heads of mutual different azimuth angles. By this feature of the system of the invention, reproduced signals of relatively high levels are obtained not only at the time of still picture reproduction but also at the time of other changed speed reproduction such as multiplied speed reproduction, even at minimum reproduced signal level.

Further objects and features of the invention will be apparent from the following detailed description when read in conjunction with the accompanying drawings.

BRIEF DESCRIPTION OF THE DRAWINGS

In the drawings:

FIG. 2 is a bottom view of a rotary guide drum showing mounting positions of heads;

FIG. 3 is a block diagram indicating a track pattern at the time of recording;

FIGS. 5A and 5B are respectively a diagram indicating the scanning track pattern at the time of double speed fast (quick) motion reproduction and a graph indicating the level of the reproduced signal.

DETAILED DESCRIPTION

Figure 1:
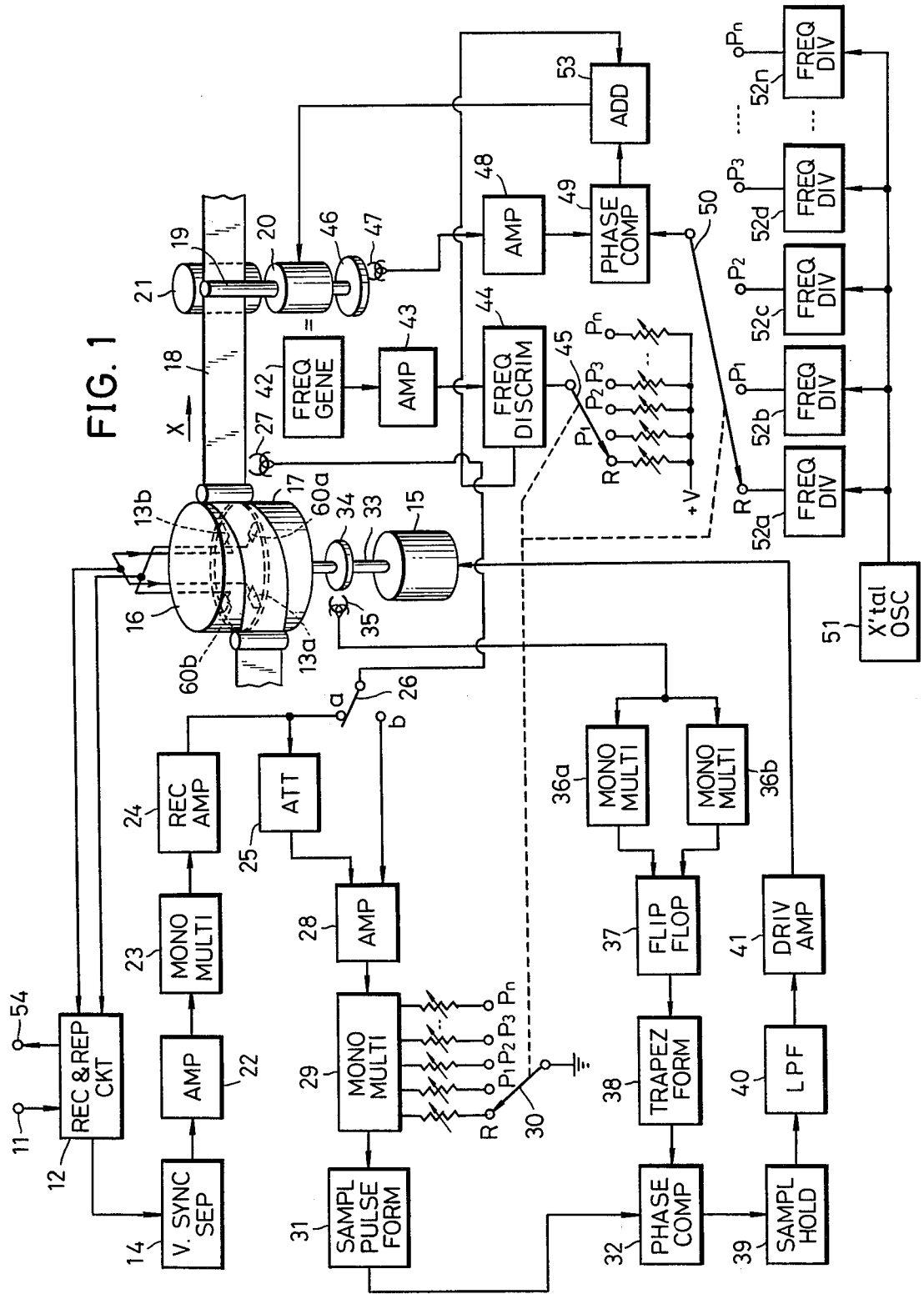
FIG. 1 is a block diagram of one embodiment of the system for speed-change reproduction of video signals according to the invention.

In FIG. 1 a video signal to be recorded is introduced into the system shown through an input terminal 11, is passed through a recording and reproducing circuit 12, and is supplied to a pair of recording and reproducing video heads 13a and 13b and to a vertical synchronizing signal separation circuit 14. The video heads 13a and 13b mutually have opposite azimuths and the same track widths as described hereinafter and are mounted on diametraically opposed sides of a rotary drum 16 as shown in FIG. 2, which is rotated at a rotational speed of 30 rps. by a head motor 15. A magnetic tape 18 is wrapped obliquely around the rotary drum 16 and a stationary drum 17. Capstan 19 drives the tape which travels in the arrow direction X. Capstan 19 is driven by a motor 20 and acts against a pinch roller 21. A video signal is recorded by the video heads 13a and 13b which alternately trace along tracks on the tape 18, successively one field per track. The tracks are resultingly positioned contiguously to each other and obliquely relative to the longitudinal direction of the tape.

On the other hand, a vertical synchronizing signal of 60 Hz which has been separated from the video signal in the vertical synchronizing signal separation circuit 14 is passed through an amplifier 22 and supplied to a monostable multivibrator 23. There its frequency is halved to 30 Hz. The resulting output signal is passed through a recording amplifier 24 and supplied to an attenuator 25. At the same time, the output signal is transmitted by way of a switch 26, with its moving contact on contact point a, to a control head 27, by which the signal is recorded as a control signal on the lower edge of the tape 18.

The signal which has passed through the attenuator 25 is supplied through an amplifier 28 to a monostable multivibrator 29. The switching and setting of the time constant of this monostable multivibrator 29 is carried out by the change-over or a switch 30, as described hereinafter. Resistors of different resistance values are connected between the monostable multivibrator 29 and the contacts of the switch 30. This switch 30 is connected to the contact point R at the time of recording and at the time of normal reproducton. The output pulse signal of the monostable multivibrator 29 is formed into a sampling pulse signal by a sampling pulse forming circuit 31 and is thereafter supplied to a phase comparator (sampling circuit) 32.

The rotary drum 16 is coaxially mounted on a vertical rotating shaft 33, which is driven by the motor 15 and rotates together with the rotary drum 16. A pair of magnets of opposite polarity are mounted on a rotating disc 34 fixed coaxially to the rotating shaft 33. Together with rotation of the rotary drum 16, pulses of positive polarity and negative polarity are picked up by a head 35 are supplied to and trigger monostable multivibrators 36a and 36b. The outputs of the monostable multivibrators 36a and 36b, having waveforms, are supplied to a flip-flop circuit 37. The resulting output of the flip-flop circuit 37 is the waveform which is supplied to a trapezoidal wave forming circuit 38 to produce a trapezoidal wave which is then supplied to the phase comparator 32.

In the phase comparator 32, the sampling pulses from the sampling pulse forming circuit 31 samples the inclined part of the trapezoidal wave. The resulting output signal of the phase comparator 32 is held by a sampling-hold circuit 39. The trapezoidal wave is then supplied through a low-pass filter 40 for removing high frequency components and integrating to a driving amplifier 41 and then to the motor 15 thereby controlling the rotation thereof. The rotational phase of the motor 15 is controlled to select the sampling position on the trapezoidal wave in the phase comparator 32. For example, sampling may be in the middle position of the inclined part of the trapezoidal wave.

In the above described embodiment, the rotation of the motor 15 is controlled by means of the phase comparator 32. However, the rotational phase of the motor 15 may be controlled by driving the motor 15 at a constant speed, while the phase comparator 32 controls an electromagnetic braking of the motor 15. Otherwise, the rotation of the capstan 19 may also be controlled by the output of the phase comparator 32 so that the travelling phase of the tape 18 is controlled, to control the scanning phases of the heads 13a and 13b, with respect to the tracks on the tape 18.

Together with the rotation of the capstan motor 20, a frequency generator 42 coupled thereto produces an output signal. This output signal is passed through an amplifier 43. The amplified signal is supplied to a frequency discriminator 44, where it is frequency discriminated. To the frequency discriminator 44 is connected a selection switch 45 whose moving contact can be connected to any of a plurality of contact terminals R and P1 through Pn, each of which P terminals is respectively connected to a different resistor. This switch 45 is selectively operated so that a voltage corresponding to a frequency to be discriminated is applied to the frequency discriminator 44. In the recording and normal reproducing modes, the moving contact of the switch 45 is connected to the terminal R.

Furthermore, a rotating disc 46 is coaxially fixed to the rotor shaft of the capstan motor 20 and is provided with a pair of magnets. A detection head 47 operates cooperatively with the magnets to produce rotation indicating pulses as the capstan motor 20 rotates. These rotation pulses are amplified in an amplifier 48 and supplied to a phase comparator 49. On the other hand, a crystal oscillator 51, supplies a signal of a stable specific frequency to each of a plurality of frequency dividers 52a through 52n. These frequency dividers 52a through 52n, are hereinafter described more fully. They, respectively, have different specific frequency-dividing ratios corresponding to respective tape speeds from which a tape speed can be selected.

A selection switch 50 selects the output of one of these frequency dividers 52a through 52n. The selected output is suppied to the phase comparator 49, where it is compared with the signal from the detection head 47. The switch 50 is synchronously intercoupled with the above described switches 30 and 45 and therefore is operated interrelatedly therewith. The moving contacts of these switches 30, 45, and 50 are connected to their contacts R at the time of recording or of normal reproduction. The comparison error output of the phase comparator 49 is suppied to an adder 53, where it is added to the output signal from the above described frequency discriminator 44. The rotation of the motor 20 is controlled by the output signal of the adder 53.

At the time of a speed-change reproduction mode of operation, the switches 30, 45, and 50 are switched to their contact points for the selected tape speed. The output of that freuquency divider, among the frequency dividers 52a through 52n, corresponds to the selected tape speed and is supplied to the phase comparator 49. As a consequence, the motor 20 causes the tape 18 to travel at a predetermined speed in accordance with the speed-change reproduction mode, as described hereinafter. For still picture reproduction, the motor 20 is not rotated, and the travel of the tape 18 is stopped. The video signals reproduced by the video heads 13a and 13b pass through the recording and reproducing circuit 12 and are led out through an output terminal 54.

At the time of reproduction, the moving contact of the switch 26 is switched to the contact point b. The control signal reproduced by the control head 27 is supplied through the switch 26 and the amplifier 28 to the monostable multivibrator 29. The switch 30 is switched, in accordance with the reproducing mode, to one of its contact points P1 through Pn respectively, in order to complete a circuit through one of the resistors of different resistance values. The time constant of the monostable multivibrator 29 is selected by switching over of the switch 30 in accordance with the speed-change reproduction mode.

At the time of reproduction, also, the motor 15 turns the rotary drum 16 at a rotational speed of 30 Hz. The signal obtained by using the signal picked up by the pickup head 35 and the output signal of the monostable multivibrator 29 are phase compared. In response to the resulting output signal, the rotational phase of the motor 15 is controlled. This operation is similar to that used at the time of recording.

The video heads 13a and 13b, as shown in FIG. 3, respectively have gaps 55a and 55b which are inclined by an angle $\alpha$ mutually in the opposite direction relative to the direction perpendicular to the scanning direction, that is, have azimuths of the angle $\alpha$. These video heads 13a and 13b have respectively the same track width W1 and are provided so that their respective centers of the track width are at the same reference face of the rotary drum 16.

The gaps of the video heads 13a and 13b respectively have mutually opposite azimuths. Therefore, due to azimuth losses no signal is reproduced if the video heads 13b and 13a respectively scan the tracks recorded by the video heads 13a and 13b (i.e., where a so-called reverse tracking is carried out). At the time of normal reproduction in FIG. 1, the rotational phase of the motor 15 is controlled so that the sampling pulses will sample the middle part of the slope of the trapezoidal wave which is formed in correspondence with pulses of positive polarity from the pickup head 35. These pulses of positive polarity are generated in coincidence with the rotational position of, for example, the head 13a. For this reason, in a normal reproduction mode, the rotational phases of the video heads 13a and 13b are controlled so that they always scan (positive tracking) the tracks recorded by these heads 13a and 13b, respectively. The reverse tracking does not occur.

Tracks t1, t3, t5, . . . are formed by the head 13a, while tracks t2, t4, t6, . . . are formed by the head 13b.

In this case, the tracks t1, t2, t3, ... are in contiguous contact without gaps therebetween, whereby the tape utilization efficiency is high. Each track is recorded with a part of a video signal corresponding to substantially one field. A vertical synchronizing signal is positioned near an end of the track. Although not shown, an audio signal and a control signal are recorded respectively at the upper and lower lateral edges of the tape 18 along tracks in the longitudinal direction of the tape.

At the time of normal reproduction, the magnetic tape 18 travels at the same tape speed Vo as the speed of the tape at the recording time. The recorded signal is reproduced by the head 13a and 13b alternately from the tracks in normal tracking, whereby the normal reproduced picture is obtained.

In the system of the present invention, at the time of speed-change reproduction, when reproduction is carried out at a tape speed (inclusive of zero, also) differing from the tape speed at the time of normal reproduction, the tape speed is selected to satisfy the following equation.

$$V = Vo\,(n - 1/n)$$

where:
  V is the tape speed for speed-change reproduction mode;
  Vo is the tape speed for normal reproduction mode (and recording); and
  n is a positive or negative integer.

The rotating speed of the heads 13a and 13b is always constant, i.e., 30 rps. in all reproduction modes.

By selecting the tape speed to satisfy this equation, there is a constant minimum signal strength position, where the reproduced signal level drops due to reproduction with the heads 13a and 13b deviating from their tracks. The minimum signal strength occurs at the same distance from the tape edge, that is, at the position on the reproduced picture screen. In the case where the tape speed does not satisfy the above equation, the position of the noise bar arising in accompaniment with the minimal reproduced signal level is not constant in the reproduced picture. Consequently, the quality of the entire reproduced picture is impaired by the noise, whereby a practically useful reproduced picture cannot be obtained.

As shown in FIG. 2, in addition to the first pair of recording and reproducing video heads 13a and 13b having azimuth angles α of mutually opposite direction, the rotary drum 16 also has a second pair of exclusively reproducing video heads 60a and 60b on the peripheral part thereof at mutually diametrically opposed positions. These exclusively reproducing heads 60a and 60b have gaps 61a and 61b of the same azimuth angle α, which may be the same as the gap angle on either of the heads 13a and 13b, for example, that of the head 13a. Furthermore, the heads 60a and 60b have a track width W2 which is greater than the track width W1 of the heads 13a and 13b, for example, equal to 1.5W1. These exclusively reproducing heads are mounted at positions such that their track width centers are in one and the same rotational plane. These heads 60a and 60b are used only during the time of speed-change reproduction.

An example of still picture reproduction wherein n=1 in the equation set forth hereinbefore, whereby V=0, that is, the tape travel is stopped, will now be described with reference to FIGS. 4A and 4B.

Figure 4A:
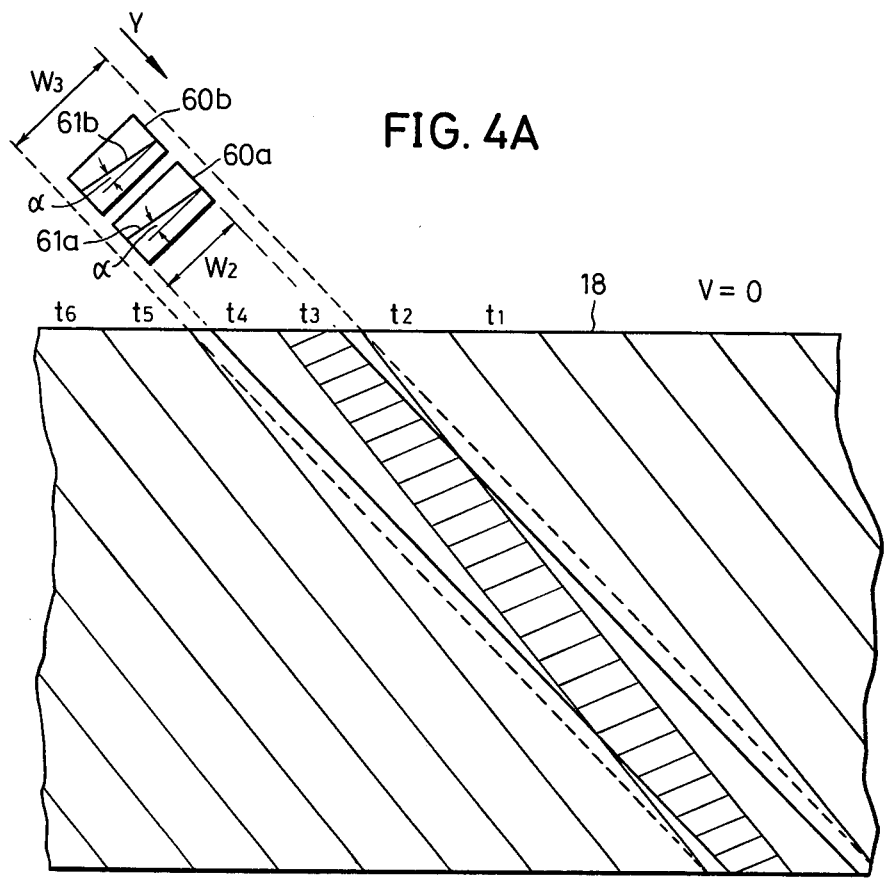
FIGS. 4A and 4B are respectively a diagram indicating the scanning track pattern at the time of still picture reproduction and a graph indicating the variation with time of the level of the reproduced signal.
Figure 4B:
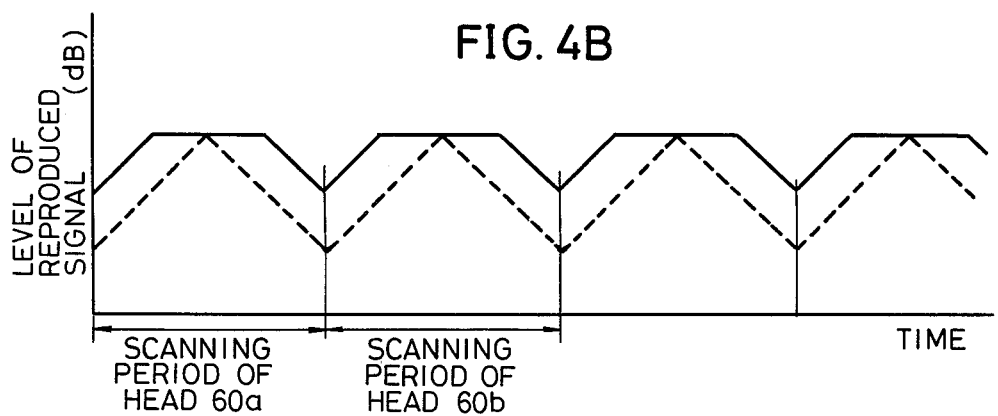

Referring to FIG. 4A, when the head 60a starts to scan from a position at which it is straddling the tracks t3 and t4, it scans along the path indicated by full line and terminates its scanning at a position where it straddles the tracks t2 and t3. Since the tape 18 is stopped, the head 60b also traces the same locus that was traced by the head 60a. Thereafter, the above described scanning operation is repeated. The heads 60a and 60b have a normal tracking relationship to the track t3, and a reverse tracking relationship to the tracks t4 and t2. Therefore, from the heads 60a and 60b, the reproduced signal is obtained from only the track t3. At the two edge part of the track t3, the heads 60a and 60b cannot scan a part in the transverse or width direction of the track. In the vicinity of the central part of the track t3, the heads 60a and 60b can scan the full track width. For this reason the level of the reproduced signal obtained from these heads 60a and 60b become as indicated in FIG. 4B.

Then, since the signal repeatedly obtained from the heads 60a and 60b is a signal of the same single field which was recorded along the track t3, the still picture obtained from this reproduced signal is a picture without vibration or flickering in which all movement is stopped, even when the video information content which has been recorded is one of rapid motion.

In the illustrated embodiment of the invention, the track width W2 of the heads 60a and 60b is made equal to 1.5W1, but this relation is not thus restricted. For example, the width W2 may be made equal to the width W1. In this case, the reproduced signal level decreases as indicated by a broken line in FIG. 4B, but there is no change in the effect of a completely still picture reproduced from the same track by the same field being obtained.

In this connection, in order to raise the reproduced signal level, the track width W2 of the heads 60a and 60b may be increased. However, if this width W2 is made greater than the width W3 indicated in FIG. 4A, the heads 60a and 60b will reproduce, in addition to the proper track t3 on which a signal has been recorded by the head 13a of the same azimuth angle, and which was originally to have been scanned and reproduced, parts of the tracks t5 and t1 which were also recorded by the head 13a. In the case where parts of the tracks t5 and t1 are reproduced simultaneously with the track t3, undesirable beat disturbance occurs in the reproduced picture. Accordingly, it is desirable that the track width W2 be selected at a value which is greater than the track width W1 but is less than the track width W3 across the total width of two tracks. For this reason W2 was made equal to 1.5W1 in the above described embodiment of the invention.

Since the difference between the inclination angle of the tracks and the inclination angle of the scanning paths of the heads is very small, W3 is approximately equal to 2W1. Accordingly, W2 should be selected to satisfy the relationship $W1 \leq W2 \leq 2W1$.

Next, an example of fast (quick) motion reproduction wherein n is made equal to −1, that is, V=2Vo, or double-speed reproduction, will be described in conjunction with FIGS. 5A and 5B.

For this double-speed fast-motion reproduction, the moving contact of the switch 50 is connected to its contact point P1. A signal of a frequency corresponding to double-speed which has been frequency divided by the frequency divider 52b is thereby supplied to the phase comparator 49. As a consequence, the motor 20 is controlled so that is rotates at a speed which is twice that for normal reproduction of the tape 18. The capstan 20 is rotated at twice the normal speed. The tape 18 is driven at a travelling speed which is twice the travelling speed Vo for normal recording or reproducing. The switch 30 is changed over to the contact point P1. The time constant of the monostable multivibrator 29 is changed over and set at a value, in correspondence to this double-speed fast-motion reproduction. As a result, the fall time instant of the output pulse signal of the monostable multivibrator 29 is changed in response to this time constant. The control system of the motor 15 controls the rotational phase of the motor 15 in a manner such that the heads 60a and 60b start to scan the tracks from the starting ends as shown in FIG. 5A.

The head 60a starts its scanning from a position, for example, where it is straddling the tracks t2 and t3 and terminates its scanning at a position where it is straddling the tracks t3 and t4. Similarly, the head 60b starts its scanning from a position where it is straddling the tracks t4 and t5 and ends its scanning at a position where it is straddling the tracks t5 and t6. The tracks t3 and t5 are respectively scanned in normal tracking by the heads 60a and 60b, while the tracks t2, t4, and t6 are scanned in reverse tracking. For this reason, the reproduced signals of the tracks t3 and t5 are respectively obtained from the heads 60a and 60b. The level of the reproduced signals obtained from the heads 60a and 60b is as indicated in FIG. 5B. Thus, in the case of double-speed reproduction, the heads 60a and 60b respectively scan normal tracks of odd subscripts with the same scanning paths. For this reason, a reproduced signal of the same level waveform is obtained for every field, as is apparent from FIG. 5B.

When the tape speed is selected at the value given by the equation set forth above, the position of the noise bar on the picture become constant. However, the present invention is not limited to this speed, it being permissible to use other tape speeds. For example, in the case where the tape speed is an even-number multiple of the normal speed, such as quadruple speed, sextruple speed, etc., the effect is the same as the effect in the case of double-speed.

At the time of slow motion reproduction, the magnetic tape may travel and stop intermittently by using the system disclosed in U.S. patent application Ser. No. 9,077, entitled "System for reproducing a video signal in a slow motion or still picture reproduction", filed Feb. 2, 1979, now U.S. Pat. No. 4,246,616, issued Jan. 20, 1981. In this case, at the time of tape travelling and stopping, the heads carry out the same reproduction, as in still picture reproduction. As a whole, slow motion reproduction is carried out. For example, by repeating the operations normal reproduction by causing the tape to travel at normal speed during the period of two fields and then carrying out still picture reproduction by stopping the tape during the succeeding two fields, a slow-motion reproduced picture of one-half speed is obtained, as a whole. Particularly in the case where this system is used, a slow-motion reproduced picture of little noise and natural motion can be obtained.

Further, this invention is not limited to these embodiments but variations and modifications may be made without departing from the scope of the invention.

What is claimed is:

1. A video signal, speed-change reproducing system for reproducing video signals which are recorded by a pair of alternately active rotary recording heads mounted on diametrically opposed sides of a rotating member, said video signals being recorded on video tracks disposed contiguously and obliquely relative to the tape longitudinal direction, said recording heads having gaps of mutually different azimuth angles, the reproducing system comprising:

means comprising a capstan and a motor for driving the capstan in rotation, said capstan driving the tape in tape travel or stopping the tape;

control means comprising means for supplying a plurality of signals of predetermined frequencies corresponding to predetermined tape speeds used for reproducing modes, means for selectively deriving one of said predetermined frequency signals corresponding to a selected reproducing mode, and means for controlling the rotation of the capstan motor in response to the selected frequency signal; and a pair of reproducing heads which are used exclusively for reproducing, said heads being mounted on diametrically opposed sides of a rotational member, both gaps of said reproducing heads having the same azimuth angle which corresponds to an azimuth angle of the gap on either one of said recording heads.

2. A system for speed-change reproduction of video signals as claimed in claim 1 further having a second pair of rotary recording and reproducing heads provided at other diametrically opposed positions on said rotational member for recording and for reproducing at the time of normal reproduction, said second pair of heads having gaps of mutually different azimuth angles.

3. A system for speed-change reproduction of video signals as claimed in claim 1 in which each of said pair of reproducing heads which are used exclusively for reproduction has a gap with a width W2 within the range expressed by $W1 \leq W2 \leq 2W1$, where W1 represents the width of a gap of said recording head.

4. A system for speed-change reproduction of video signals as claimed in claim 3 in which said width W2 is selected so that $W2 \approx 1.5 W1$.

5. A system for speed-change reproduction of video signals as claimed in claim 1 in which said control means controls said driving means to cause said tape to travel at a selected speed V represented by the equation $V = Vo(n - 1/n)$, wherein Vo is the tape speed for normal reproduction (and recording), and n is a positive or negative integer.

* * * * *